United States Patent [19]

Koden et al.

[11] Patent Number: 5,209,867
[45] Date of Patent: May 11, 1993

[54] DERIVATIVES OF α-(4-SUBSTITUTED PHENYL)ETHYL ALCOHOLS AND LIQUID CRYSTAL COMPOSITIONS CONTAINING THE SAME

[75] Inventors: Mitsuhiro Koden; Tomoaki Kuratate, both of Nara; Fumiaki Funada, Yamatokoriyama, all of Japan

[73] Assignee: Sharp Kabushiki Kaisha, Osaka, Japan

[21] Appl. No.: 815,580

[22] Filed: Dec. 30, 1991

Related U.S. Application Data

[63] Continuation of Ser. No. 701,346, May 5, 1991, abandoned, which is a continuation of Ser. No. 321,079, Mar. 9, 1989, abandoned.

[30] Foreign Application Priority Data

| Mar. 10, 1988 | [JP] | Japan | 63-57295 |
| Jul. 6, 1988 | [JP] | Japan | 63-169951 |
| Jul. 22, 1988 | [JP] | Japan | 63-183924 |
| Jul. 29, 1988 | [JP] | Japan | 63-191165 |

[51] Int. Cl.$^5$ .............. C09K 19/12; C09K 19/20; C07C 69/76
[52] U.S. Cl. .............. 252/299.65; 252/299.67; 560/55; 560/59; 560/64; 560/102; 560/107
[58] Field of Search .............. 252/299.01, 299.64, 252/299.65, 299.66, 299.67; 560/8, 55, 59, 64, 73, 84, 102, 106, 107

[56] References Cited

U.S. PATENT DOCUMENTS

| 4,627,933 | 12/1986 | Eidenschink et al. | 252/299.6 |
| 4,728,458 | 1/1988 | Higuchi et al. | 252/299.65 |
| 4,904,409 | 2/1990 | Hiyazawa et al. | 252/299.61 |
| 4,911,863 | 3/1990 | Sage et al. | 252/299.65 |

FOREIGN PATENT DOCUMENTS

| 62-240378 | 10/1987 | Japan. |
| 63-51359 | 3/1988 | Japan. |
| WO87/5012 | 8/1987 | PCT Int'l Appl. . |

OTHER PUBLICATIONS

CA 093(9): 94494j, Roof, Antonius A. M. et al., "Photochemistry of α-Arglcarboxylic Anhydride", 1980.

Primary Examiner—Robert L. Stoll
Assistant Examiner—Shean C. Wu
Attorney, Agent, or Firm—Birch, Stewart, Kolasch & Birch

[57] ABSTRACT

Novel derivatives of aromatic carboxylic acid esters which are useful as a dopant for liquid crystal compositions, and smectic liquid crystal compositions containing at least one of said derivatives.

12 Claims, 4 Drawing Sheets

DERIVATIVES OF α-(4-SUBSTITUTED PHENYL)ETHYL ALCOHOLS AND LIQUID CRYSTAL COMPOSITIONS CONTAINING THE SAME

This application is a continuation of application Ser. No. 07/701,346 filed on May 5, 1991, now abandoned, which is a continuation of application Ser. No. 07/321,07 filed on Mar. 9, 1989, now abandoned.

BACKGROUND OF THE INVENTION

1. Field of the Invention

The present invention relates to novel derivatives of α-(4-substituted phenyl)ethyl alcohols and liquid crystal compositions containing at least one of said derivatives.

2. Description of the Prior Art

Presently, liquid crystal display devices predominantly utilize the nematic phase of liquid crystals, while active research has also been conducted in recent years on various display modes utilizing smectic phases. Liquid crystal display which utilizes a ferroelectric liquid crystal exhibiting chiral smectic C phase is expected to be especially promising because it is adapted to high-capacity display and has wide viewing angles.

The above-mentioned ferroelectric liquid crystals are first required to exhibit chiral smectic C phase in the wide range of temperatures at around room temperature. In order to realize high-capacity displays, they are also required to have high-speed responsibility as a device characteristic. Thus, ferroelectric liquid crystals are required to have higher spontaneous polarization and lower viscosity. In addition, in order to show good orientation and bistability in a liquid crystal cell, they are required to exhibit a phase sequence of I.NAC (Isotropic-Nematic-Smectic-A-Smectic C) or IAC (Isotropic-Smectic-A-Smectic C), and to have sufficient longer helical pitch in nematic and smectic C phase.

At the present time, there is no single liquid crystal compound which satisfies all requirements mentioned above and therefore ferroelectric liquid crystal mixtures are usually prepared by adding an optically active compound to a liquid crystal composition or compound with low viscosity. But because such liquid crystal composition with good quality should satisfy various requirements as mentioned above, the compositions are sometimes necessary to be prepared by mixing a compound such as an optically active one other than liquid crystalline compounds.

The requirements other than the high-speed responsibility of the above-mentioned conditions have been satisfied by conventional mixing techniques, but the high-speed responsibility have not been sufficiently obtained yet.

Accordingly, it has been also desired to develop new optically active compounds which can induce greater spontaneous polarization in liquid crystal compositions to realize the high-speed responsibility.

Recently, such compounds as unsubstituted α-phenylethyl 4'-alkoxybiphenyl-4-carboxylates have been reported as an optically active compound used by adding to liquid crystal compositions (Japanese Published Unexamined Patent Application No. 583/1987, published on 6th Jan., 1987).

SUMMARY OF THE INVENTION

According to the present invention, there are provided α-(4-substituted phenyl)ethyl alcohol derivatives of the formula (I);

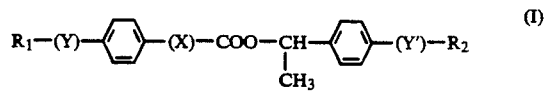

wherein $R_1$ and $R_2$ are, the same or different, a straight or branched chain alkyl group having 1 to 12 carbon atoms, X is a single bond,

or —$CH_2$— group, Y and Y' are, the same or different, a single bond or —O—.

Further, according to the invention, there is provided a liquid crystal composition containing one or more liquid crystal compounds exhibiting smectic C phase and at least one -of the α-(4-substituted phenyl) ethyl alcohol derivatives of the formula (I).

DESCRIPTION OF THE PREFERRED EMBODIMENTS

Figure 1:
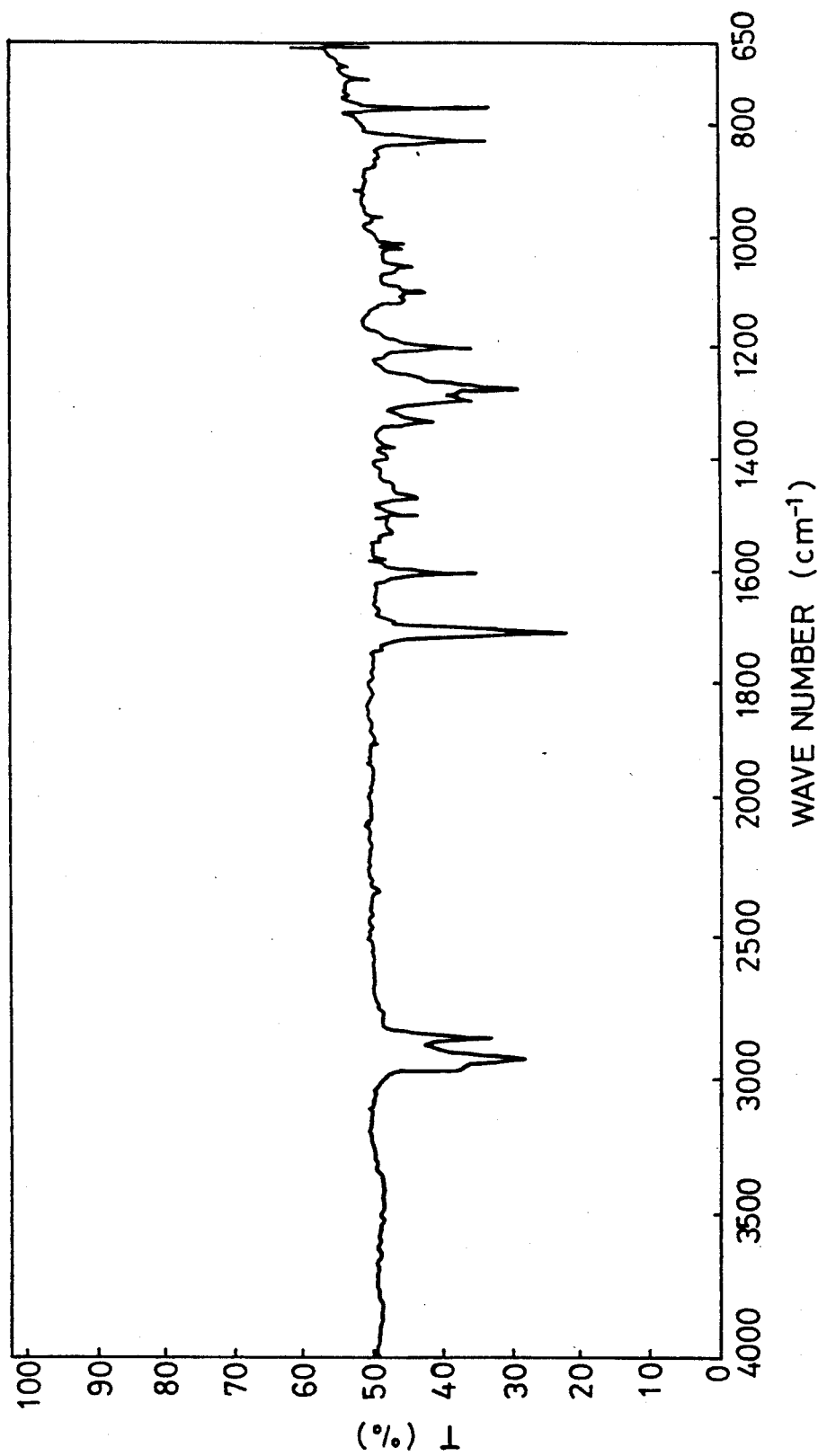
FIGS. 1 to 4 show the infrared spectrums of the compounds of Examples 1-a, 1-b, 1-c and 1-e, respectively.

The compounds of the above formula (I) are those which have been never disclosed in prior references.

The term "a straight or branched chain alkyl group having 1 to 12 carbon atoms" as defined in the above formula (I) means methyl, ethyl, propyl, i-propyl, butyl, i-butyl, t-butyl, pentyl, 2-methylbutyl, 2,2-dimethylpropyl, hexyl, 2- or 3-methylpentyl, 2,2-dimethylbutyl, 4-methylhexyl, 2- or 3-methylheptyl, 6-methyloctyl, n-heptyl, 2,2-dimethylpentyl, 3,3-trimethylpentyl, 2,4-dimethylpentyl, n-octyl, 2,2,3,3,-tetramethylbutyl, nonyl, decyl, undecyl, dodecyl group or the like. An asymmetric carbon atom may be contained in each of these alkyl groups.

The compounds of the formula (I) in the present invention can be classified into the following four groups i), ii), iii) and iv) wherein X, Y and Y' in the formula (I) are described below. Preferable compounds in each of the groups are as follows. i) X=

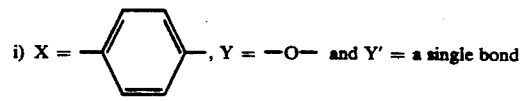

, Y=-O- and Y'=a single bond

In this group, α-(4-methylphenyl)ethyl 4-(4'-n-pentyloxy-biphenyl)carboxylate, α-(4-n-octylphenyl)ethyl 4-(4'-n-pentyloxy-biphenyl)carboxylate, α-(4-methylphenyl)ethyl 4-(4'-n-octyloxy-biphenyl)carboxylate, α-(4-n-octylphenyl)ethyl 4-(4'-n-octyloxy-biphenyl)carboxylate, α-(4-dodecylphenyl)ethyl 4-(4α-n-octyloxy-biphenyl)carboxylate, α-(4-methylphenyl)ethyl 4-[4'-(2-methylheptyl)oxy-biphenyl]carboxylate, α-(4-n-octyl-phenyl)ethyl 4-[4'-(2-methylheptyl)oxybiphenyl]carboxylate, α-[4-(2-methylheptyl)phenyl]ethyl 4-(4'n-octyloxybiphenyl)carboxylate and the like are included.

ii) X=a single bond, Y=—O— and Y'=a single bond

In this group, α-(4-methylphenyl)ethyl 4-n-pentyloxy-benzoate, α-(4-n-octylphenyl)ethyl 4-n-pentyloxybenzoate, α-(4-methylphenyl)ethyl 4-n-octyloxybenzoate, α-(4-n-octylphenyl)ethyl 4-n-octyloxybenzoate, α-(4-dodecylphenyl)ethyl 4-n-octyloxybenzoate, α-(4-n-octylphenyl) ethyl 4-n-decyloxybenzoate, α-(4-methylphenyl)ethyl 4-(2-methylheptyl)oxybenzoate, α-(4-n-octylphenyl)ethyl 4-(2-methylheptyl)oxybenzoate, α- 4-(2-methylheptyl) phenyl ethyl 4-n-octyloxybenzoate and the like are included.

iii) X=—CH₂— and Y and Y'=—O—

In this group, α-(4-methoxyphenyl)ethyl 4-methoxyphenylacetate, α-(4-heptyloxyphenyl)ethyl 4-methoxyphenylacetate, α-(4-decyloxyphenyl)ethyl 4-pentyloxyphenylacetate, α-(4-methoxyphenyl)ethyl 4-octyloxyphenylacetate, α-(4-heptyloxyphenyl)ethyl 4-octyloxyphenylacetate, α-(4-dodecyloxyphenyl)ethyl 4-octyloxyphenylacetate, α-(4-heptyloxyphenyl)ethyl 4-dodecyloxyphenylacetate, α-(4-pentyloxy)ethyl 4-(2-methylheptyl)oxyphenylacetate, α-(4-heptyloxy)ethyl 4-(2-methylheptyl)oxyphenylacetate and the like are included.

iv) X=—CH₂—, Y=a single bond and Y'=—O—

In this group, α-(4-methoxyphenyl)ethyl 4-methylphenylacetate, α-(4-heptyloxyphenyl)ethyl 4-methylphenylacetate, α-(4-decyloxyphenyl)ethyl 4-pentylphenylacetate, α-(4-methoxyphenyl)ethyl 4-octylphenylacetate, α-(4-heptyloxyphenyl)ethyl 4-octylphenylacetate, α-(4-dodecyloxyphenyl)ethyl 4-octylphenylacetate, α-(4-heptyloxyphenyl)ethyl 4-dodecylphenylacetate, α-(4-pentyloxy)ethyl 4-(2-methylheptyl)phenylacetate, α-(4-heptyloxy)ethyl 4-(2-methylheptyl)phenylacetate and the like are included.

The compound of the formula (I) can be prepared, for example, by reacting a substituted phenyl carboxylic acid of the formula (II):

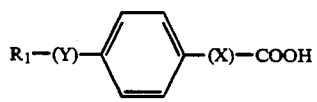

(II)

wherein Y and X are defined as above, with an α-(4-substituted phenyl)ethyl alcohol of the formula (III):

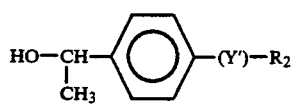

(III)

wherein Y' is defined as above.

In the above reaction, the carboxylic acids of the formula (II) are preferably used in the form of compounds converted into their reactive derivatives, for example, the halides such as chlorides, bromides or the like. The reaction is generally carried out under heating in an inert organic solvent such as toluene, xylene or the like. In the reaction that the carboxylic acid of the formula (II) is used in the form of an acid halide, it can be carried out in the presence of a dehydrochlorinating agent such as pyridine.

The carboxylic acids of the formula (II) mentioned above can be synthesized from p-hydroxybiphenyl or p-hydroxybenzoic acid in accordance with the method described in Ichiro Nakata and Bunichi Hori, "Methods for preparing liquid crystals and their application", Saiwai Shodo of Tokyo, Japan, page 70 (1974), and the alcohols of the formula (III) can be synthesized, for example, by reduction of a p-alkylacetophenone.

The alcohols of the formula (III) have an asymmetric carbon atom at the α-position, and therefore when an optically active compound of these alcohols (d- or l-compound) is used in the reaction, the corresponding optically active compound of the formula (I) can be obtained. When racemic compounds of these alcohols are used, the compounds of the formula (I) can be also obtained.

The derivatives of α-(4-substituted phenyl)ethyl alcohols of the present invention include all of such d- and l- isomers, racemic compounds and the like. Optically active compounds of such compounds of the present invention are useful as dopants in liquid crystal compositions. Namely, each of the compounds of the formula (I) has an asymmetric carbon atom adjacent to its ester group and a structure having stereochemically large phenyl rings at both sides of the asymmetric carbon atom. Accordingly, if such compound is used as an optically active compound, free rotation of the ester group and the groups around the asymmetric carbon atoms is restricted and greater spontaneous polarization of the compound can be expected. Accordingly, the compound itself does not show any liquid-crystalline phase, but it is useful as a dopant to liquid crystal compositions. This compound particularly expresses strong spontaneous polarization inducing action when added to a liquid crystal compound exhibiting smectic C-phase and consequently a ferroelectric liquid crystal composition with higher responsibility, which it has been difficult to be prepared, can be provided using the above compound.

Thus, according to the present invention, a liquid crystal composition is provided which is obtained by adding at least one of the compounds of the formula (I) to one or more liquid crystal compounds exhibiting smectic C phase.

According to the present invention, various liquid crystal compounds exhibiting smectic C phase are usable which are known in the art. Examples of such compounds are those represented by the following formula (IV), (V) or (VI).

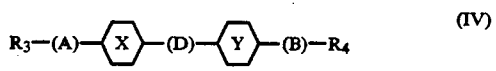

(IV)

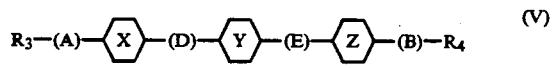

(V)

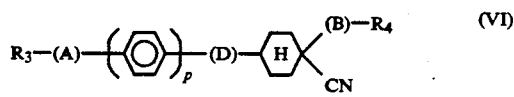

(VI)

wherein A and B are each a single bond or the group —COO—, —OCO—, —CH=CH—COO—, —O-CO—CH=CH—, —O—, —S—, —OCOO— or —CO—; D and E are each a single bond or the group —COO—, —OCO—, —CH=N—, —N=CH—, —CH=CH—, —C≡C—, —CH=CH—COO—, —OCO—CH=CH—, —CH$_2$CH$_2$—, —OCH$_2$—, —CH$_2$O—, —COS— or —SCO—;

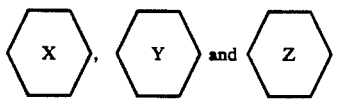

are each a 6-membered ring such as benzene ring, pyridine ring, pyrimidine ring, pyrazine ring, pyridazine ring, piperazine ring, cyclohexane ring, pyran ring, dioxacyclohexane ring, thiapyran ring, dithian ring, thiadiazine ring, bicyclo[2.2.2]octane ring or tetrazine ring, such a 6-membered ring having or not having a fluorine, chlorine or bromine atom, cyano, nitro, lower alkyl or lower alkoxy group or deuterium (D) substituting for the hydrogen atom in the ring; $R_3$ and $R_4$ are each a straight-chain or branched-chain alkyl or alkoxy group having 1 to 12 carbon atoms; and p is an integer of 1 or 2.

Of course, such compounds can be used by mixing two or more of them.

These smectic liquid crystal compounds are suitably used for practical usage by mixing it so that the mixture shows smectic phase C near room temperature and has a phase sequence such as IAC, INAC or the like.

The compound of the formula (I) is suitably mixed with a liquid crystal composition in the amount of 0.5 to 20% by weight and preferably in the amount of 1 to 10% by weight. The amount of less than 0.5% by weight is insufficient in the effect of increasing the responsibility of liquid crystal compositions and also the amount of more than 20%. by weight makes unstable the thermal stability of smectic C phase, so that the amount departing from the above range is unsuitable.

The compounds of the formula (I) of the present invention induce higher spontaneous polarization, and they are useful for various uses, particularly for improvement of responsibility of liquid crystal compositions.

The smectic liquid crystal composition obtained by mixing the compound of the present invention is improved in responsibility in comparison with a composition which does not contain the compound of the present invention or contains an optically active compound other than the compound of the present invention. Accordingly, an ideal ferroelectric liquid crystal composition can be obtained by selecting a suitable smectic liquid crystal compound and mixing it with the compound of the present invention.

PREPARATION OF COMPOUNDS OF THE PRESENT INVENTION

Example 1-a

Preparation of α-(4-n-octylphenyl)ethyl 4-(4'-n-octyloxy-biphenyl)carboxylate

Phosphorus pentachloride (0.65g, 0.0031 mol) was added to 4-(4'-n-octyloxy-biphenyl)carboxylic acid (0.8g, 0.0026 mol) and the mixture was allowed to react by heating at about 80° C. POCl$_3$ and excess phosphorus pentachloride were completely removed by evaporation in vacuo to obtain 4-(4'-n-octyloxy-biphenyl)carbonyl chloride. This chloride was dissolved in toluene (10 ml) and to the mixture were added S-(—)-α-(4-n-octylphenyl)ethyl alcohol (0.5g, 0.0021 mol) and pyridine (1 ml, a dehydrochlorinating agent). The mixture was allowed to stand for 10 hours at room temperature, warmed at 60° C and maintained as such for 3 hours, and then cooled. The resulting mixture was added to diluted hydrochloric acid and the resultant was extracted with ether. The ether layer was washed with an aqueous solution of NaHCO$_3$ and then with water, and dried over Na$_2$SO$_4$. The ether was distilled off and the residue was purified by means of a column chromatography (solvent : chloroform). After removing the solvent, the resultant was recrystallized from ethanol to obtain the objective compound of α-(4-n-octylphenyl)ethyl 4-(4'-n-octyloxy-biphenyl)carboxylate. The infrared spectrum of said compound is shown in FIG. 1. This compound did not show any liquid crystalline phase and showed the following transition temperature (melting point). The angle of rotation [α]25 of the compound was 98.7° (solvent : chloroform).

$$\text{Crystal} \xrightarrow{51°\text{ C.}} \text{Isotropic liquid}$$

Example 1-b

Preparation of α-(4-n-octylphenyl)ethyl 4-n-decy-loxybenzoate

Figure 2:
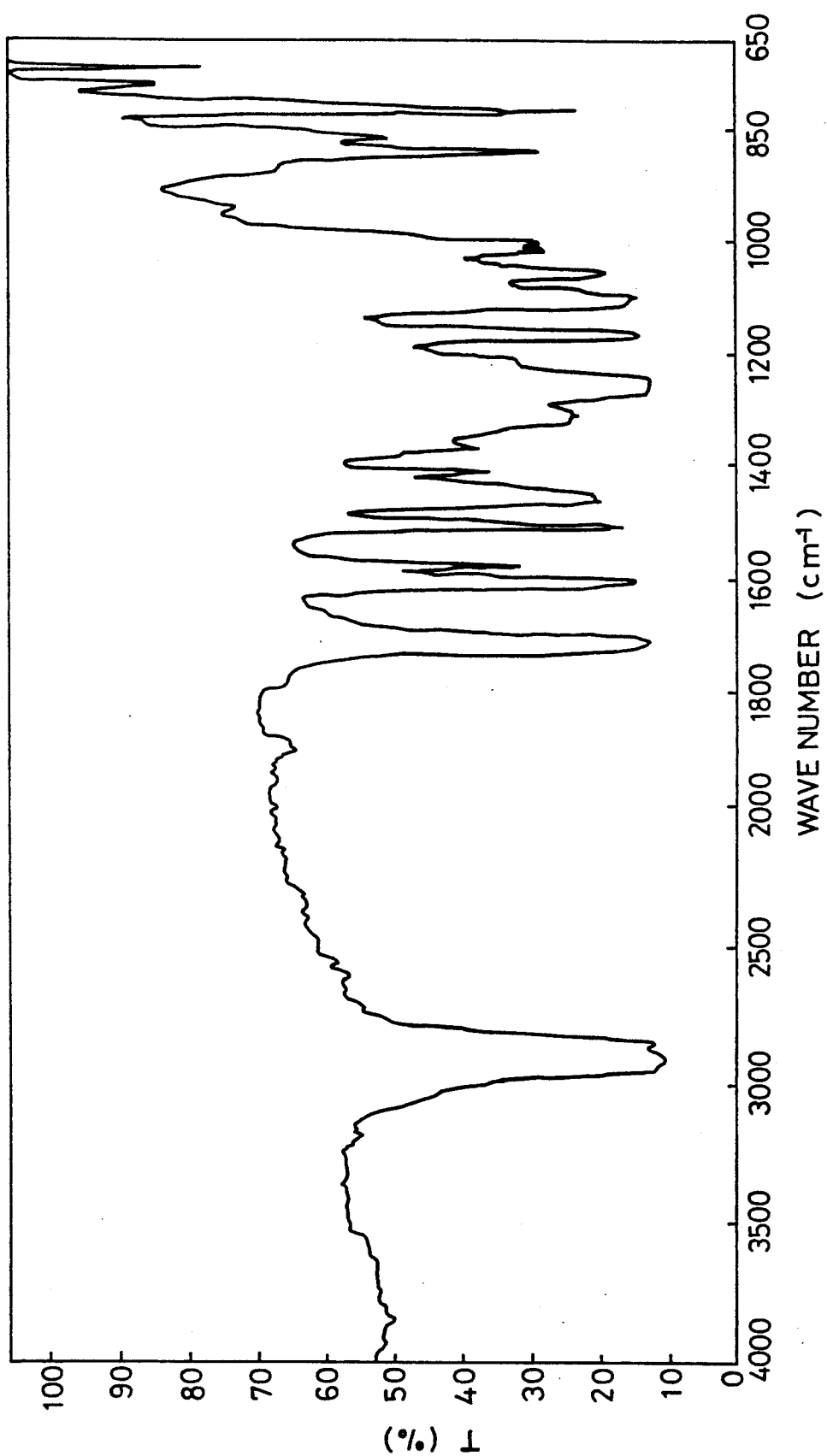

Phosphorus pentachloride (0.80g, 0.0038 mol) was added to 4-n-decyloxybenzoic acid (1.0g, 0.0036 mol) and the mixture was allowed to react by heating at about 80° C. POCl$_3$ and excess phosphorus pentachloride were completely removed by evaporation in vacuo to obtain 4-n-decyloxybenzoyl chloride. This chloride was dissolved in toluene (10 ml) and to the mixture were added R-(+)-α-(4-n-octylphenyl)ethyl alcohol (0.84g, 0.0036 mol) and pyridine (1 ml, a dehydrochlorination agent). The mixture was allowed to stand for 10 hours at room temperature, warmed at 60° C. and maintained as such for 3 hours, and then cooled. The resulting mixture was added to diluted hydrochloric acid and the resultant was extracted with ether. The ether layer was washed with an aqueous solution of NaHCO$_3$ and then with water, and dried over Na$_2$SO$_4$. The ether was distilled off and the residue was purified by means of a column chromatography (solvent : chloroform) to obtain the objective compound of α-(4-n-octylphenyl)ethyl 4-n-decyloxybenzoate. The infrared spectrum of said compound is shown in FIG. 2. This compound did not show any liquid crystalline phase and it was a liquid at room temperature. The angle of rotation [α]$^{25}$$_D$ of the compound was —26.0° C. (solvent : chloroform).

Example 1-c

Preparation of α-(4-n-heptyloxyphenyl)ethyl 4-n-octyloxyphenylacetate

Figure 3:
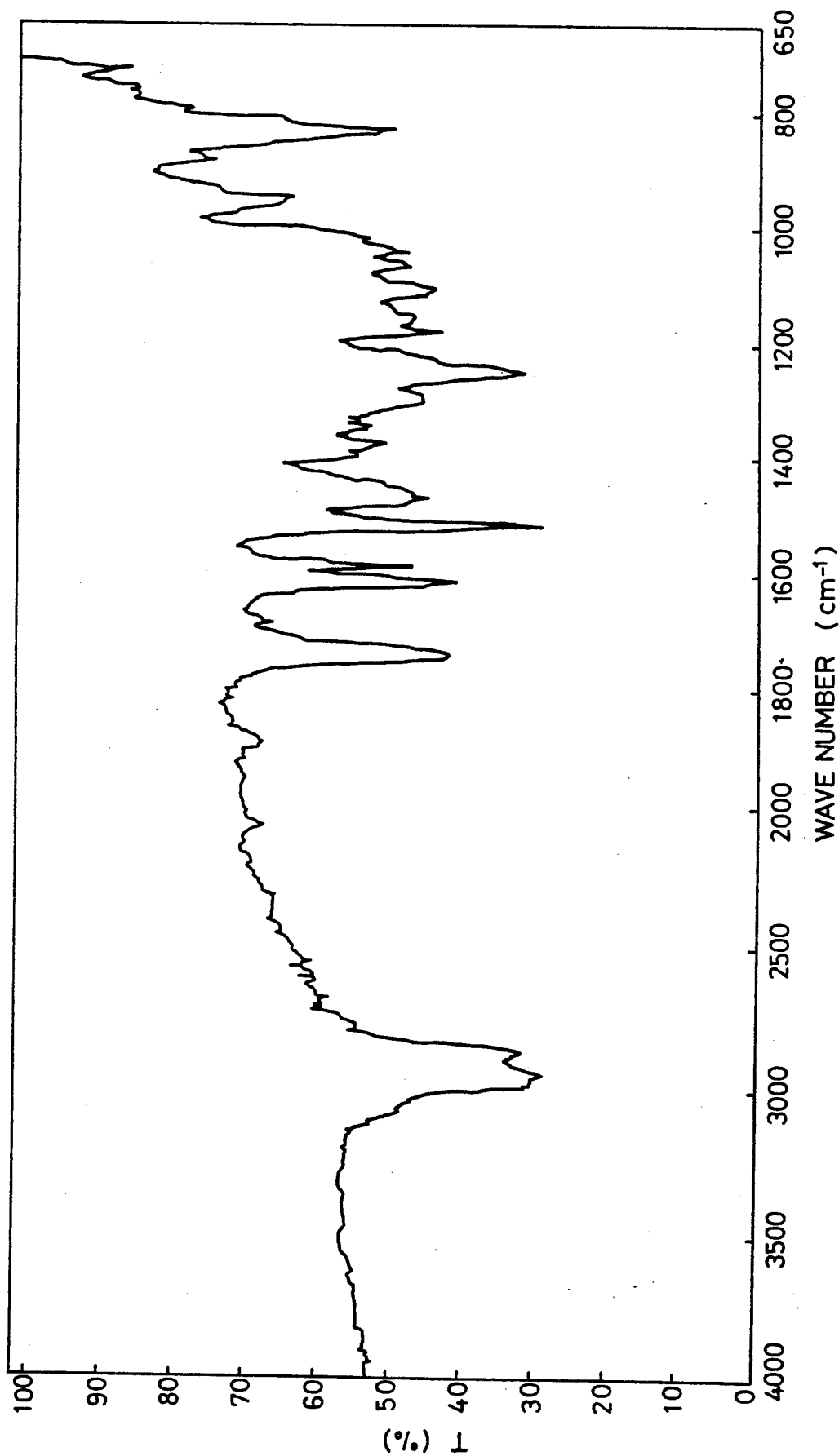

Phosphorus pentachloride (1.1g, 0.0053 mol) was added to 4-n-octyloxyphenylacetic acid (1.3g, 0.0049 mol) and the mixture was allowed to react by heating at 80° C. POCl$_3$ and excess phosphorus pentachloride were completely removed by evaporation in vacuo to obtain 4-n-octyloxyphenylacetyl chloride. This chloride was dissolved in toluene (10 ml) and to the mixture were added S-(—)-α-(4-n-heptyloxyphenyl)ethyl alcohol (1.0g, 0.0042 mol) and pyridine (1 ml, a dehydrochlorinating agent). The mixture was permitted to stand for 10 hours at room temperature, warmed at 60° C. and maintained as such for 3 hours, and then cooled. The resulting mixture was added to diluted hydrochloric acid and the resultant was extracted with ether. The ether layer was washed with an aqueous solution of NaHCO$_3$ and then with water, and dried over Na$_2$SO$_4$. The ether was distilled off and the residue was purified by means of a column chromatography (solvent : chloroform) and the resultant was recrystallized from ethanol to obtain the above compound of α-(4-n-heptyloxyphenyl)ethyl 4-n-octyloxyphenylacetate. The infrared spectrum of this compound is shown in FIG. 3. This compound did not show any liquid crystalline phase, and it was a liquid at room temperature. The angle of rotation $[\alpha]^{25}_D$ of the compound was −52.4° (solvent : chloroform).

Example 1-d

Preparation of α-(4-n-hyptyloxyphenyl)ethyl 4-methoxyphenylacetate

The objective compound of α-(4-n-heptyloxyphenyl)ethyl 4-methoxyphenylacetate was obtained by the same procedure as that described in Example 1-c except for using 4-methoxyphenylacetic acid instead of 4-n-octyloxyphenylacetic acid used in Example 1-c. The resulting compound was also an isotropic liquid at room temperature and did not show any liquid crystalline phase. Further its angle of rotation $[\alpha]^{25}_D$ was −37.3° (solvent : chloroform).

Example 1-e

Preparation of α-(4-n-heptyloxyphenyl) ethyl 4-methylphenylacetate

Figure 4:
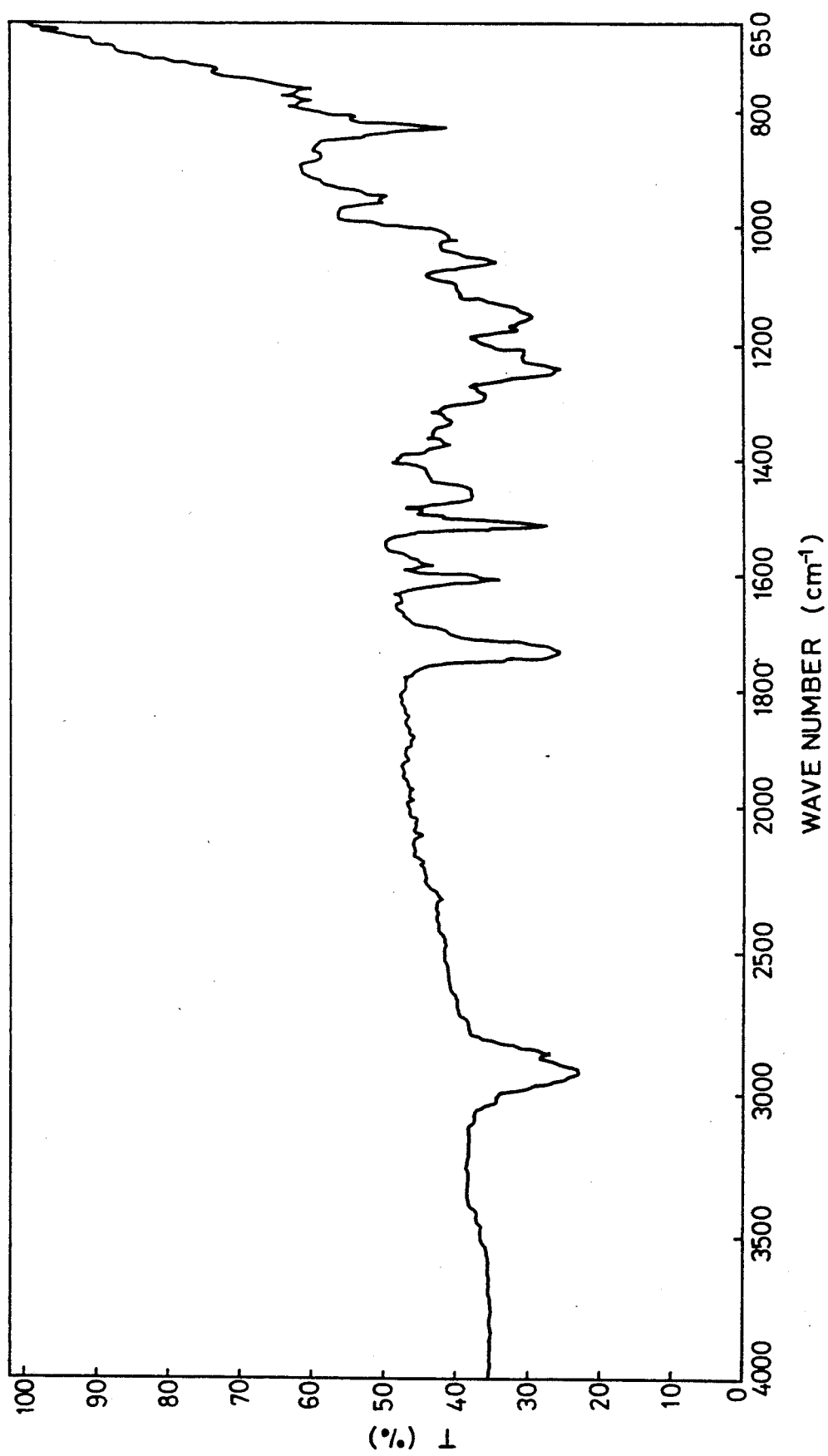

Phosphorus pentachloride (1.1g, 0.0053 mol) was added to 4-methylphenylacetic acid (0.76g, 0.0051 mol) and the mixture was allowed to react by heating at about 80° C. POCl$_3$ and excess phosphorus pentachloride were completely removed by evaporation in vacuo to obtain 4-methylphenylacetyl chloride. This chloride was dissolved in toluene (10 ml) and to the mixture were added S-(−)-α(4-n-heptyloxyphenyl)ethyl alcohol (1.0g, 0.0042 mol) and pyridine (1 ml, a dehydrochlorinating agent). The mixture was permitted to stand for 10 hours at room temperature, warmed at 60° C. and maintained as such for 3 hours, and then cooled. The resulting mixture was added to diluted hydrochloric acid and the resultant was extracted with ether. The ether layer was washed with an aqueous solution of NaHCO$_3$ and then with water, and dried over Na$_2$SO$_4$. The ether was distilled off and the residue was purified by means of a column chromatography (solvent : chloroform) and the resultant was recrystallized from ethanol to obtain the objective compound of α-(4-n-heptyloxyphenyl)ethyl 4-methylphenylacetate. The infrared spectrum of said compound is shown in FIG. 4. This compound did not show any liquid crystalline phase and it was a liquid at room temperature. The angle of rotation $[\alpha]^{25}_D$ of the compound was −13.1° (solvent : chloroform).

PREPARATION OF FERROELECTRIC LIQUID CRYSTAL COMPOSITIONS

Example 2

Ferroelectric liquid crystal compositions were prepared by using each of the compounds prepared in Examples 1-a to 1-c and 1-e. The formulations of the liquid crystal compositions are shown in Table 1.

TABLE I

| Formulation | Content (% by weight) |
|---|---|
| Smectic liquid crystal compound | |
| $C_8H_{17}O$—⟨phenyl⟩—COO—⟨phenyl⟩—$OC_6H_{13}$ | 3 |
| $C_6H_{13}$—⟨phenyl⟩—⟨phenyl⟩—COO—⟨phenyl⟩—$OC_6H_{13}$ | 3 |
| $C_6H_{13}$—⟨pyrimidine⟩—⟨phenyl⟩—O—$O_4H_9$ | 5 |
| $C_8H_{17}$—⟨pyrimidine⟩—⟨phenyl⟩—O—$(CH_2)_3$—$\overset{*}{C}H$—$C_2H_5$ with $CH_3$ | 9 |
| $C_8H_{17}$—⟨pyrimidine⟩—⟨phenyl⟩—O—$(CH_2)_5$—$\overset{*}{C}H$—$C_2H_5$ with $CH_3$ | 13 |
| $C_{11}H_{23}O$—⟨pyrimidine⟩—⟨phenyl⟩—O—$CH_2$—$\overset{*}{C}$—$C_2H_5$ with $CH_3$ | 13 |

TABLE I-continued

| Formulation | Content (% by weight) |
|---|---|
| C₈H₁₇—⟨N=N⟩—⟨⟩—O—CH₂—CH₂—*CH(CH₃)—C₂H₅ | 18 |
| C₁₁H₂₃O—⟨N=N⟩—⟨⟩—O—CH₂—CH₂—*CH(CH₃)—C₂H₅ | 32 |
| Compound of the formula (I) according to the present invention | 4 |

The above transition temperature of each of the above compositions is shown in Table II. Since all of the above liquid crystal compositions have a IAC phase sequence, the use of them in liquid crystal cells permits to obtain readily a good orientation, and the compositions thus obtained showed smectic C liquid crystal phase having ferroelectricity at room temperature.

The identification of liquid crystal phases such as the smectic A phase ($S_A$), the smectic C pahse ($S_C$) and the like was carried out by observing the texture of the compositions by a polarizing microscope with a hot stage and by confirming miscibility of the compositions of the present invention with a conventional liquid crystal compound in use of the phase diagram of the two component.

TABLE II

| Compound of the formula (I) in Table I | Smectic C → Smectic A | Smectic A → Isotropic liquid |
|---|---|---|
| Example 1-a | 50° C. | 66° C. |
| 1-b | 50° C. | 64° C. |
| 1-c | 51° C. | 64° C. |
| 1-e | 45° C. | 62° C. |

Speed of Response

Example 3

Liquid crystal display devices were prepared by using each of the liquid crystal compositions prepared in Example 2. An ITO film was each formed on 2 plates of glass substrate and the substrates were coated with nylon film and then rubbed. The resulting two substrates were placed opposite to each other with same rubbing directions and sealed to obtain a cell of 2 μm in clearance. Into this cell was poured one of the liquid crystal compositions prepared in Example 2. After pouring, the cell was heated to 75° C. at which the liquid crystal composition changed to an isotropic liquid and then was cooled to room temperature at a cooling rate of 1° C. in to obtain a liquid crystal device with a good orientation. The resulting device was disposed between two poralizing plates with their axes arranged perpendicularly to each other. An electric field was applied to the resulting assembly and the change of intensity of transmitted light was observed. The speed of response was determined from the above change when the electric field of $V_{p-p}=20V$ was applied to the assembly at 25° C. The results are shown in Table III.

It can be seen from Table III that the compounds of the formula (I) are remarkably effective for increasing responsibility of ferroelectric liquid crystal compositions even with addition of only a little amount of said compound.

TABLE III

| Compound of the formula (I) in Table I | Speed of response (μsec) |
|---|---|
| Example 1-a | 181 |
| 1-b | 263 |
| 1-c | 353 |
| 1-e | 289 |

Example 4

α-(4-n-Octylphenyl)ethyl (R,S)4-[4'-(1-methylhexyloxy)biphenyl]carboxylate was prepared by the same method described in Example 1-a except for using 4-[4'-(1-methylheptyloxy-biphenyl)]carboxylic acid instead of 4-(4'-n-octyloxy-biphenyl)carboxylic acid used in Example 1-a. The phase transition temperature from crystals to an isotropic liquid (melting point) of the resulting compound was 47° C. and its angle of rotation $[\alpha]^{25}_D$ was +67.5°.

Example 5

The non-chiral smectic C liquid crystal composition (B) shown in Table IV was prepared.

Its phase transition was as follows.

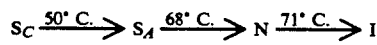

$$S_C \xrightarrow{50°\,C.} S_A \xrightarrow{68°\,C.} N \xrightarrow{71°\,C.} I$$

TABLE IV

| Formulation | Content (% by weight) |
|---|---|
| C₇H₁₅—⟨N=N⟩—⟨⟩—OC₇H₁₅ | 10 |
| C₇H₁₅—⟨N=N⟩—⟨⟩—OC₈H₁₇ | 5 |
| C₇H₁₅—⟨N=N⟩—⟨⟩—OC₉H₁₉ | 15 |

TABLE IV-continued

| Formulation | Content (% by weight) |
|---|---|
| 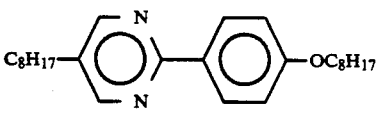 | 10 |
| 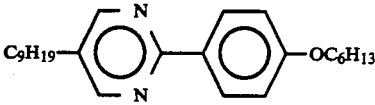 | 15 |
| 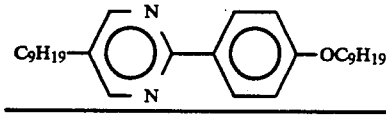 | 45 |

The chiral smectic C liquid crystal compositions were prepared by adding to the liquid crystal composition (B) each of the compounds prepared in Example 1-a and Example 4, and a comparative compound of u-phenylethyl (R)4-(4'n-octyloxy-biphenyl)carboxylate ($[\alpha]^{25}_D = -7.75°$, the phase transition temperature from crystals to an isotropic liquid $= 72°$ C). The liquid crystal display devices were prepared using each of the resulting compositions by the same method as in Example 3, and the speed of response and the tilt angle of the devices were determined. The results are shown in Table V.

TABLE V

| Composition | Phase transition temperature (°C.) $S_c \rightarrow S_A \rightarrow N \rightarrow I$ | | | Speed of response (μsec) | Tilt angle (deg) |
|---|---|---|---|---|---|
| Composition (B) + Compound of Example 1-a (2%) | 42 | 68 | 80 | 164 | 10 |
| Composition (B) + Compound of Example 1-a (4%) | 33 | 66 | 68 | 80 | 11 |
| Composition (B) + Compound of Example 4 (2%) | 43 | 66 | 69 | 179 | 10 |
| Composition (B) + Comparative compound (2%) | 41 | 68 | 80 | 191 | 12 |

As can be seen from the results in the above Table, the compounds of the present invention, when added to a conventional liquid crystal composition, give to said composition higher speed of response in comparison with the comparative compound, and particularly the composition prepared by adding the compound of Example 1-a in the amount of 4% by weight showed a much higher speed of response of 80 μsec.

What is claimed is:

1. A liquid crystal composition comprising:
   at least one α-(4-Substituted phenyl)ethyl alcohol compound of the formula (I):

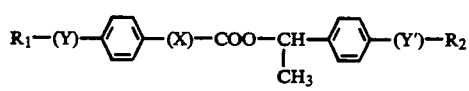

(I)

wherein $R_1$ and $R_2$ are the same or different and are a straight or branched chain alkyl group having 1 to 12 carbon atoms, X is

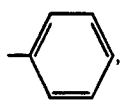

Y is —O— and Y' is a single bond; and
one or more liquid crystal compounds exhibiting smectic C phase represented by the following formula (IV), (V) or (VI):

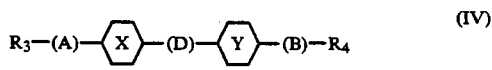 (IV)

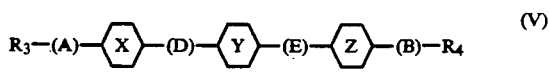 (V)

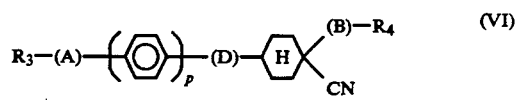 (VI)

wherein A and B are each a single bond or the group —COO—, —OCO—, —CH=CH—COO, —OCO—CH=CH—, —O—, —S—, —OCOO— or —CO; D and E are each a single bond or the group —COO—, —OCO—, —CH=N—, —N=CH, —CH=CH—, —C≡C—, —CH=CH—COO—, —OCO—CH=CH—, —CHCH$_2$—, —OCH$_2$—, —CH$_2$O—, —COS— or —SCO—;

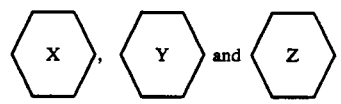

are each a 6-membered ring such as benzene ring, pyridine ring, pyrimidine ring, pyrazine ring, pyridazine ring, piperazine ring, cyclohexane ring, pyran ring, dioxacyclohexane ring, thiapyran ring, dithian ring, thiadizaine ring, bicyclo (2.2.2) octane ring or tetrazine ring, such a 6-membered ring having or not having a fluorine, chlorine or bromine atom, cyano, nitro, lower alkyl or lower alkoxy group or deuterium (D) substituting for the hydrogen atom in the ring; $R_3$ and $R_4$ are each a straight-chain or branched-chain alkyl or alkoxy group having 1 to 12 carbon atoms; and p is an integer of 1 or 2.

2. The composition of claim 1 which shows smectic C phase near room temperature.

3. The composition of claim 1 in which the compound(s) of the formula (I) are contained in the amount of 0.5 to 20% by weight.

4. A compound of claim 1, which comprises α-(4-methylphenyl)ethyl 4-(4'-n-pentyloxy-biphenyl)carboxylate.

5. A compound of claim 1, which comprises α-(4-n-octylphenyl)ethyl 4-(4'-n-pentyloxy-biphenyl)carboxylate.

6. A compound of claim 1, which comprises α-(4-methylphenyl)ethyl 4-(4'-n-octyloxy-biphenyl)carboxylate.

7. A compound o claim 1, which comprises α-(4-n-octylphenyl)ethyl 4-(4'-n-octyloxy-biphenyl)carboxylate.

8. A compound of claim 1, which comprises α-(4-dodecylphenyl)ethyl 4-(4'-n-octyloxybiphenyl)carboxylate.

9. A compound of claim 1, which comprises α-(4-methylphenyl)ethyl 4-{4'-(2-methylheptyl)oxy-biphenyl=-carboxylate.

10. A compound of claim 1, which comprises α-(4-n-octylphenyl)ethyl 4-{4'-(2-methylheptyl)oxy-biphenyl}carboxylate.

11. A compound of claim 1, which comprises α-{4-(2-methylheptyl)phenyl}ethyl 4-(4'n-octyloxybiphenyl)-carboxylate.

12. A composition of claim 1, wherein the compounds of formula (I) are selected from the group consisting of α-(4-methylphenyl)ethyl 4-(4'-n-pentyloxy-biphenyl)carboxylate, α-(4-n-octylphenyl)ethyl 4-(4'-n-pentyloxy-biphenyl)carboxylate, α-(4-methylphenyl)ethyl 4-(4'-n-octyloxy-biphenyl)carboxylate, α-(4-n-octylphenyl)ethyl 4-(4'-octyloxy-biphenyl)carboxylate, α-(4-methylphenyl)ethyl4-{4-(2-methylheptyl)oxy-biphenyl}carboxylate, α-(4-n-octylphenyl)ethyl 4-{4'-(2-methylheptyl)oxybiphenyl}carboxylate and α-{4-(2-methylheptyl)phenyl}ethyl 4-(4'n-octyloxybiphenyl)-carboxylate.

* * * * *